United States Patent Office 2,723,448
Patented Nov. 15, 1955

2,723,448

BRAZING PROCESS

Mike A. Miller, New Kensington, Pa., assignor to Aluminum Company of America, Pittsburgh, Pa., a corporation of Pennsylvania No Drawing. Application August 30, 1952,
Serial No. 307,383

11 Claims. (Cl. 29—494)

This invention relates to brazing aluminous metal members and is more especially concerned with that form of joining operation known as dip brazing. In referring to aluminous metal it should be understood that the term includes aluminum and those alloys containing more than 50% of that metal.

In the dip brazing process the members to be joined are assembled in the desired structural relationship to each other with a suitable filler metal provided at the joints, and the assembly immersed in a fused salt flux bath maintained at a temperature above the melting point of the filler metal but below the melting point of the structural members. The salt flux bath serves both to heat the assembly to the brazing temperature and promote the flow of filler metal. The salt baths used heretofore have contained active salts in sufficient amounts to cleanse the surface of the structural members and aid the spread of the filler metal in the joint area. The base or major portion of the dip brazing salt baths has generally consisted of two or more alkali metal chlorides and the active portion has been composed of other halides, especially the fluorides of alkali metals and aluminum. In particular, lithium halides have been included in nearly all commercial brazing fluxes because they not only reduce the melting point of the salt mixtures but they have a very desirable effect on the flow of molten brazing alloy on the aluminous metal surface. Fluxes containing no lithium halides have been regarded as inferior and unreliable. Lithium salts are relatively expensive and, at times, are difficult to obtain. All previous endeavors that have been made to replace those salts have had no commercial success, as far as is known.

Another difficulty associated with the dip brazing process has been the loss of the flux bath brought about by decomposition of one or more of the components by hydrolysis or other reactions and the drag-out of molten flux clinging to the brazed article when withdrawn from the molten salt bath. The decomposition is influenced by the amount of water present in the bath and the nature of the flux components employed, some being more greatly affected by water than others. The presence of some water is unavoidable, it being introduced by fresh salt additions, by the parts being brazed or merely by exposure of the salt bath to the atmosphere. Thus, even though a salt mixture might be completely anhydrous when first melted, it quickly picks up some moisture which reacts with one or more of the salts. The reaction not only causes a loss of individual salts but creates an undesirable sludge that must be removed eventually. In any event, the loss has been compensated for in the past by making fresh flux and flux component additions to the bath.

The drag-out of a certain amount of flux from the bath is unavoidable in the dip brazing operation. Obviously, the loss is of greater economic importance where the flux contains relatively costly material, such as lithium-containing compounds. Up to the present time it has not been found possible to use a dip brazing flux composed almost entirely of low cost halides because such fluxes either do not clean and flux the aluminous metal surface, they have such a short life as to be of no practical value in plant operations and they are very sensitive to the adverse effect of impurities.

It is an object of this invention to provide a method of dip brazing aluminous metal members in salt baths composed for the most part of salts which have little or no fluxing action on the metal surface. Another object is to provide a method of activating a salt bath substantially devoid of ability to flux an aluminous surface. Still another object is to provide a method of dip brazing aluminous metal members in a salt bath activated by a new means but which permits use of the dip brazing procedures of the prior art. A further object is to provide a method of dip brazing in a bath which is substantially free from sludge formation resulting from hydrolysis of salt components. Still another object is to provide a flux bath which contains a very small amount of lithium salts, or even none at all, and yet has a sufficient degree of activity for dip brazing purposes.

These and other objects are attained in whole or in substantial part by dip brazing aluminous metal members in a low melting point mixture of salts, the nature and relative amounts of which are defined more fully hereinbelow, where the mixture has been treated with at least one anhydrous gaseous hydrohalide of the group composed of hydrogen chloride and hydrogen fluoride. I have found that only a very small amount of the hydrohalide is necessary to activate the fused salt bath. Salt baths that contain little or no lithium salts, when treated in this manner, have been found to possess, in a high degree, the characteristics of prior art fluxes, which included large amounts of lithium compounds. In addition, it has been discovered that fluxes activated in this manner exhibit a remarkable resistance to sludge formation arising from hydrolysis of salt components. The hydrohalide does not form a gaseous blanket on the aluminous metal, as far as can be determined, but is dissolved, sorbed or otherwise held by the fused salt. The hydrohalide appears to establish what I believe to be is a non-oxidizing condition as opposed to an oxidizing condition. An oxidizing condition is considered to exist when the surfaces of the aluminum parts become coated with an oxide film which prevents brazing.

The salt bath, referred to above, should contain as its essential components 0.5 to 10% of at least one salt of the group consisting of beryllium fluoride, magnesium fluoride, aluminum fluoride and the double aluminum fluorides with the alkali metals, or an alkali metal fluoride and aluminum fluoride in the proportion necessary to form a double fluoride, from 2 to 60% of a hydrolyzable chloride of the group consisting of beryllium chloride, calcium chloride, barium chloride, strontium chloride, and magnesium chloride and at least one alkali metal chloride, exclusive of lithium chloride, in the amount of 30 to 80%, the sum of the hydrolyzable and alkali metal chloride components constituting the major portion of the flux components.

The amount of hydrohalide which is necessary to activate a salt bath and develop the desired flux characteristics is very small, not more than enough to saturate the molten salt bath. By "saturation" I mean the maximum capacity of the fused salt for holding the hydrohalide, both chemically and physically. At present there is no known means of ascertaining the actual amount of hydrohalide which is present at any given time, the performance of the salt bath being the only sure indication of whether enough hydrohalide is present. If a satisfactory brazed joint can be made between an aluminous brazing sheet and another member under normal operating conditions, enough hydrohalide is present. If no brazing occurs, or if the joint is only partially formed, there is a deficiency of hydrohalide. On the other hand, if the metal is visibly etched, there is an excess of hydrohalide. A certain minimum amount is required, however, as evidenced by the fact that satisfactory brazing is not accomplished immediately after the hydrohalide has been first brought into contact with a previously untreated fused salt but a period of time is necessary to establish the non-oxidizing condition. The period of time will vary with the rate of introduction of the hydrohalide and the quantity of bath being treated.

The customary procedures followed in dip brazing with conventional fluxes can be used in employing the hydrohalide-treated salt bath, that is substantially the same bath temperature ranges and periods of immersion may be employed as have been utilized in prior practice for brazing the same type of article. To secure the best results, however, it is preferable to use slightly higher temperatures than might normally be employed. The employment of the same procedures is of considerable practical advantage for it means that my activated salt bath can be substituted for conventional baths without altering the plant practice to any significant extent.

To obtain the desired characteristics in the flux bath it is necessary, as mentioned above, to include at least one salt of the group consisting of calcium chloride, barium chloride, strontium chloride, beryllium chloride and magnesium chloride. These salts hydrolyze in contact with the minute amounts of water present in the flux bath and probably form an oxide or an oxyhalide or perhaps some other oxygen-containing products. Such products are reactable with the hydrohalide introduced into the bath. The precise manner in which these chlorides function and the part the product of hydrolysis play in the flux is not clearly understood but it has been ascertained that these chlorides are essential in salt fluxes activated with hydrogen chlorides or hydrogen fluorides. The proportion of chloride to be used will vary with the one selected and the alkali metal chloride with which it is to be associated, but in any case the amount should be within the range of 2 to 60% of the weight of the flux bath. Where strontium chloride is employed, however, it is preferable to restrict it to a range of 2 to 15% and where one or more of the other chlorides of this group is used from 10 to 30% is preferred. Strontium chloride has the special effect of promoting flow of the fused filler metal between the metal members being brazed and hence it is frequently desirable to include a small amount of this salt in the flux, especially if no lithium chloride is employed.

Another essential component of my flux is a salt of the group composed of beryllium, magnesium and aluminum fluorides and the double fluorides of aluminum and the alkali metals. The double fluoride of aluminum and sodium or potassium for example, form the well-known substances known as cryolite and chiolite. If the double fluorides are not available the alkali metal and aluminum fluoride may be added to the flux in the proportions necessary to form the double fluoride. From the standpoint of cost, aluminum fluoride and the double aluminum fluorides are preferred as flux components. All of the foregoing fluorides have a beneficial action in preparing the aluminous metal surface for brazing and in their absence the action of the flux is much slower or there may be no action at all. They also appear to undergo some degree of hydrolysis as do the chlorides of the group mentioned above and with similar advantages to the performance of the flux activated with hydrogen chloride or hydrogen fluoride. In my preferred practice the fluorides are used in amounts of 2 to 5% of the weight of the flux.

The alkali metal chloride portion of the flux should be selected with a view to the melting point of the salt mixture. Sodium and potassium chlorides are considered to be neutral components inasmuch as they have no fluxing action, but they are important in providing a relatively low melting point bath. Lithium chloride, however, definitely improves the flow of fused filler metal when used in a salt bath treated in accordance with my invention. Although amounts up to as much as 25% may be used, I have found that very satisfactory flux compositions can be formulated for activation with the hydrohalide which contain from 0.2 to 5% of this chloride, and preferably less than 2%. The other alkali metal chlorides may be employed in amounts of 30 to 80% each, the total being within the same range. In my preferred compositions the portion of the flux composed of both the hydrolyzable and alkali metal chlorides should constitute between 75% and 95% of the entire composition. Of all the alkali metal chlorides those of lithium, sodium and potassium are preferred and for purposes of this invention are regarded as constituting a group of related salts.

In general the salt mixture should have a melting point no higher than about 1100° F. in order to have a bath which possesses a high fluidity and thereby minimize drag-out of flux. Ordinarily a melting point range of between 900 and 1100° F. will be found to be quite satisfactory.

The following mixtures are examples of lithium-free and low lithium salt mixtures which meet the above conditions, the proportions being expressed in percentage by weight.

| (1) | (3) |
|---|---|
| 15 NaCl | 6 NaCl |
| 41 KCl | 45 KCl |
| 30 $CaCl_2$ | 35 $MgCl_2$ |
| 6 $SrCl_2$ | 8 $SrCl_2$ |
| 8 $Na_3AlF_6$ | 6 $AlF_3$ |
| (2) | (4) |
| 58 $CaCl_2$ | 22 NaCl |
| 30 NaCl | 45 KCl |
| 6 $SrCl_2$ | 28.5 $CaCl_2$ |
| 6 $AlF_3$ | 2 LiCl |
|  | 1.5 NaF |
|  | 1 $AlF_3$ |

As indicated hereinbelow, the hydrohalides which activate the salt bath are anhydrous hydrogen chloride and hydrogen fluoride. The hydrohalides, hydrogen iodide and hydrogen bromide, probably decompose at the temperature of the fused salt, but in any event, they are ineffective in activating the salt baths for brazing purposes. Of the two useful hydrohalides, hydrogen chloride is preferred because of its low cost and that it gives rise to very little fume. It is essential, in any case, to use the dry gas to avoid an excess of water in the flux. Enough water is present in the salt bath either as a result of physical absorption or chemical reaction to react with the hydrolyzable salts.

Although the anhydrous hydrohalides may be used separately it may be advantageous to use two or more jointly. Furthermore, it is possible to dilute the hydrohalide with a suitable inert gas such as helium, argon and even nitrogen; however, care should be exercised to avoid dilution to a point where insufficeint hydrohalide is introduced.

Reference has been made hereinabove to possible saturation of salt bath with anhydrous hydrohalide but it has been learned that it is unnecessary to maintain such a condition for satisfactory brazing since the bath can be operated for a period of time without the addition of any hydrohalide providing it has been previously treated for long enough time to create the required condition in the bath for brazing. In general, however, to insure proper operation of the flux bath and for the best results it is desirable to introduce a small amount of gaseous hydrohalide almost continuously. A period of time is necessary to allow the gas to permeate the liquid salt and establish the non-oxidizing condition required for brazing. A slow rate of introduction has been found to be best suited to establishing the desired condition. After that condition has been achieved a low flow rate is sufficient to maintain the brazing characteristic of the bath. In general, a flow of 0.02 to 1.0 cc. per minute at 14.7 p. s. i. absolute pressure and 70° F. of anhydrous hydrohalide gas per pound of flux will establish and maintain the proper condition for brazing. The flow rate in any given case will, of course, be determined by the size of the bath being treated. For example, in brazing tests with a 600 pound bath composed of 59% KCl, 14% $CaCl_2$, 5% $SrCl_2$, 18% NaCl and 4% $Na_3AlF_6$ maintained at a temperature of 1120° F. it was found that a flow of 0.1 cc. per minute of anhydrous hydrogen chloride for a period of several hours activated the bath sufficiently to permit production of good brazed joints in test specimens. Prior to the introduction of any hydrogen chloride unsatisfactory brazed joints were produced on test specimens immersed in the bath. Continuation of the gas introduction at a rate of 0.02 cc. per minute per pound of flux produced very satisfactory brazed joints. Over an eight hour period, 9.6 cc. gas were introduced per pound of flux, which amounted to 5.76 liters for 600 pounds of bath treated.

The small amount of hydrohalide necessary to activate the bath and the attendant slow rate of introduction creates no serious fume problem and the usual ventilation employed in plants is adequate to dispose of any escaping gas.

The anhydrous hydrohalide may be introduced to the fused flux bath in any suitable manner either from a source of compressed gas or from a gas generator. The gas may be passed into a perforated pipe or a porous cup held near the bottom of the bath and allowed to slowly bubble through the salt bath. Other known means of contacting a liquid with a gas may be employed if adapted to operate in a fused salt environment. A perforated pipe or porous cup has the advantage of dividing the gas into small streams of bubbles and thereby obtaining better contact between the gas and the salt. Also, such a gas distributing means can be easily removed from the fused salt bath when desired. Instead of introducing the hydrohalide gas from an external source, it is possible to use decomposable halides which yield no undesirable residue. Such substances as ammonium or aluminum chloride may be employed.

The aluminous metal members to be brazed may be of any shape or size which will permit assembly and immersion in the salt flux bath. The filler metal may be provided in the form of wire, strip or stampings which are placed at the location of the joints prior to brazing or it may be supplied as a coating on a sheet as shown in United States Patent 2,312,039 or as an intermediate layer in a composite sheet product such as illustrated in United States Patent 2,602,413. The composite sheet products having a coating or intermediate layer of brazing alloy are commercially referred to as brazing sheets. This material is very well adapted to the production of brazed articles and has been found to be especially suited to the production of dip brazed products.

The filler or brazing alloy may be any one of the commonly used compositions. Aluminum-silicon alloys containing from 2 to 12% silicon are very satisfactory as well as those aluminum-silicon type alloys which contain from 2 to 5% copper and/or 7 to 12% zinc. The choice of brazing alloy will be determined, in part, by the temperature at which brazing is done; in general, those alloys having the largest amounts of added elements being useful at lower brazing temperatures than those compositions having a smaller amount of added components.

In order to insure operation of the flux bath at its highest efficiency it is necessary to purify the molten mixture prior to dip brazing by suspending pieces of aluminum in the bath for a period of time. In commercial operations, it is desirable to suspend coils of aluminum wire or strip in the bath for a number of hours during the period of melting and bringing the bath up to brazing temperature. If the bath remains idle for some time, even though in molten condition, it may be necessary to repeat the treatment of aluminum before brazing is attempted. The treatment appears to remove excess water and metallic impurities which may be associated with the salts or derived from the container or heating elements submerged in the bath. Also, the salt bath should be free from heavy metal halides.

The following examples illustrate my invention.

*Example 1*

A 1000 g. sample of a salt mixture of 56% $CaCl_2$, 30% NaCl, 6% $SrCl_2$, and 8% $Na_3AlF_6$, having a melting point of about 1050° F., was fused, heated to a temperature of 1100° F. and held at that temperature for several days, during which time it was treated with aluminum sheet coils, but no hydrohalide was added. For the brazing test an inverted T joint specimen was assembled, the horizontal portion of the T consisting of a 1" wide strip of aluminum 0.064" in thickness, and the vertical portion being a 1" wide strip of brazing sheet 0.064" in thickness, said sheet having a core of Al–1.2% Mn alloy and a coating on each side composed of an Al–7.5% Si alloy, both coatings composing 10% of the total thickness of the sheet. The assembly was immersed in the flux bath for 2 minutes, but no brazing occurred and the aluminum was etched and oxidized.

The bath was then treated by bubbling anhydrous hydrogen chloride through it for about 60 minutes at a rate of 1.0 cc. per minute per pound of flux and another T joint specimen was immersed in the bath. A good brazed joint was immediately produced.

*Example 2*

Another salt mixture of 41% KCl, 15% NaCl, 30% $CaCl_2$, 6% $SrCl_2$ and 8% $Na_3AlF_6$ was prepared having a melting point of about 1050° F. A 1000 g. sample of the mixture was melted and heated for a number of hours at 1120° F. while being purified with aluminum coils. No brazing was obtained when a T joint specimen was immersed in the bath. Anhydrous hydrogen chloride was bubbled through the bath for a period of 2 hours at the rate of 1.0 cc. per minute per pound of flux. A satisfactory brazed joint was obtained on the T joint specimen immersed in that bath. The small bath could be maintained in good brazing condition with 0.75 cc. of anhydrous HCl per minute per pound of flux.

*Example 3*

A 1000 g. sample of a salt mixture of 22% NaCl, 46% KCl, 29% $CaCl_2$, 0.5% LiCl and 2.5% $Na_3AlF_6$ was prepared having a melting point of about 1020° F. The mixture was melted and heated to 1120° F. while being purified with aluminum coils. For the brazing test an inverted T joint specimen was assembled, both the horizontal and vertical members consisting of 1" wide strips of 0.064" thick Al–1.2% Mn alloy with a ½" length of ⅛" diameter wire of Al–12.5% Si alloy at the joint. The assembly was immersed in the flux bath at 1090° F. for 5 minutes, but practically no brazing took place.

The bath was treated by bubbling anhydrous hydrogen chloride through it for about 30 minutes at a rate of 0.5 cc. per minute per pound of flux. A very satisfactory joint was then obtained in this bath.

Having thus described my invention and certain embodiments thereof, I claim:

1. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components from 2 to 60% by weight of at least one salt of the group consisting of the chlorides of beryllium, calcium, barium, strontium and magnesium, from 0.5 to 10% of at least one salt of the group consisting of the fluorides of beryllium, magnesium and aluminum and the double fluorides of aluminum and the alkali metals, and the balance consisting substantially of at least one alkali metal chloride, the total amount of all of said chlorides constituting the major portion of said salt bath, and finally withdrawing said assembly from said bath when the filler metal has established a joint between said members.

2. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components at least one salt of the group consisting of the chlorides of beryllium, calcium, barium, strontium and magnesium, the chlorides of beryllium, calcium, barium and magnesium being present in amounts of 10 to 30% and the chloride of strontium in amounts of 2 to 15%, from 2 to 5% of at least one salt of the group consisting of the fluorides of beryllium, magnesium and aluminum and the double fluorides of aluminum and the alkali metals, and the balance consisting substantially of at least one alkali metal chloride of the group consisting of sodium, potassium and lithium chlorides, the quantity of lithium chloride not exceeding 25% and the total amount of all of the chlorides in said bath being between 75 and 95% of the bath composition, and finally withdrawing said assembly from said bath when the filler metal has established a joint between said members.

3. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components from 2 to 60% by weight of at least one salt of the group consisting of the chlorides of beryllium, calcium, barium, strontium and magnesium, 0.5 to 10% of at least one salt of the group consisting of the fluorides of beryllium, magnesium and aluminum and the double fluorides of aluminum and the alkali metals, and the balance consisting substantially of at least one alkali metal chloride of the group consisting of sodium, potassium and lithium chlorides, the amount of lithium chloride being between 0.2 and 5%, and the amount of sodium and potassium chlorides being between 30 and 80%, the total amount of all of the chlorides in said salt bath constituting the major portion thereof, and finally withdrawing said assembly from said bath when the filler metal has established a joint between said members.

4. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components at least one salt of the group consisting of the chlorides of beryllium, calcium, barium, strontium and magnesium, said chlorides of beryllium, calcium, barium and magnesium being present in amounts of 2 to 60% and the chloride of strontium being present in amounts of 2 to 15%, from 0.5 to 10% of at least one salt of the group consisting of the fluorides of beryllium, magnesium and aluminum and the double fluorides of aluminum and the alkali metals and the balance consisting of sodium and potassium chlorides, and finally withdrawing said assembly from said bath when the filler metal has established a joint between said members.

5. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components from 2 to 15% by weight of strontium chloride, from 2 to 60% calcium chloride, 0.5 to 10% aluminum fluoride and the balance consisting of sodium and potassium chlorides, and finally withdrawing said assembly from said bath when the filler metal has established a joint between said members.

6. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components from 2 to 15% by weight of strontium chloride, from 2 to 60% calcium chloride, from 0.5 to 10% of a double fluoride of aluminum and an alkali metal, and the balance consisting of sodium and potassium chlorides, and finally withdrawing said assembly from said bath when the filler metal has established a joint between said members.

7. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to permit formation of brazed joints, said bath being free from heavy metal halides and having as its essential components from 2 to 60% of calcium chloride, from 0.5 to 10% of at least one salt of the group consisting of the fluorides of beryllium, magnesium and aluminum and the double fluorides of aluminum and the alkali metals, from 0.2 to 5% lithium chloride and the balance sodium and potassium chlorides in an amount between 30 and 80%, and finally withdrawing said assembly from said bath when the filler metal has established a joint between said members.

8. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath 0.02 to 1 cc. per minute of at least one anhydrous gaseous hydrohalide of the group consisting of hydrogen chloride and hydrogen fluoride per pound of salt bath for a sufficient length of time to permit the formation of brazed joints, said bath being free from heavy metal halides and having as its essential components from 2 to 60% by weight of at least one salt of the group consisting of the chlorides of beryllium, calcium, barium, strontium and magnesium, from 0.5 to 10% of at least one salt of the group consisting of the fluorides of beryllium, magnesium and aluminum and the double fluorides of aluminum and the alkali metals and the balance consisting substantially of at least one alkali metal chloride, the total amount of all of said chlorides constituting the major portion of said salt bath, and finally withdrawing said assembly from said bath when the filler metal has established a joint between said members.

9. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath 0.02 to 1 cc. per minute of anhydrous gaseous hydrogen chloride per pound of salt bath for a sufficient length of time to permit formation of brazed joints, said bath being free from heavy metal halides and having as its essential components at least one salt of the group consisting of the chlorides of beryllium, calcium, barium, strontium and magnesium, said chlorides of beryllium, calcium, barium and magnesium being present in amounts of 10 to 30% and the chloride of strontium being present in amounts between 2 to 15%, from 2 to 5% of at least one salt of the group consisting of the fluorides of beryllium, magnesium and aluminum and the double fluorides of aluminum and the alkali metals and the balance consisting substantially of at least one alkali metal chloride of the group consisting of sodium, potassium and lithium chlorides, the quantity of lithium chloride not exceeding 25% and the total amount of all of the chlorides being between 75 and 95% of the salt bath, and finally withdrawing said assembly from said bath when the filler metal has established a joint between said members.

10. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath at least one anhydrous hydrohalide of the group consisting of hydrogen chloride and hydrogen fluoride for a sufficient length of time to saturate said salt bath with said hydrohalide, said bath being free from heavy metal halides and having as its essential components from 2 to 60% by weight of at least one salt of the group consisting of the chlorides of beryllium, calcium, barium, strontium and magnesium, from 0.5 to 10% of at least one salt of the group consisting of the fluorides of beryllium, magnesium and aluminum and the double fluorides of aluminum and the alkali metals, and the balance consisting substantially of at least one alkali metal chloride, the total amount of all of said chlorides constituting the major portion of said salt bath, and finally withdrawing said assembly from said bath when the filler metal has established a joint between said members.

11. The method of brazing aluminous metal members by the dip brazing process which comprises assembling said members in the desired joint relationship to each other with filler metal adjacent each joint, immersing the assembly in a salt bath maintained at a temperature between the melting point of the filler metal and the melting point of the aluminous metal members and activated for brazing purposes by introducing into the body of said bath 0.02 to 1 cc. per minute of anhydrous gaseous hydrogen chloride per pound of salt bath for a sufficient length of time to permit formation of brazed joints, said bath being free from heavy metal halides and having as its essential components from 2 to 60% by weight of at least one salt of the group consisting of the chlorides of beryllium, calcium, barium, strontium and magnesium, from 0.5 to 10% of at least one salt of the group consisting of the fluorides of beryllium, magnesium and aluminum and the double fluorides of aluminum and the alkali metals, and the balance consisting substantially of at least one alkali metal chloride of the group consisting of lithium, sodium and potassium chlorides, the amount of lithium chloride being between 0.2 and 5% and the amount of sodium and potassium chlorides being between 30 and 80%, the total amount of all of the chlorides in said salt bath constituting between 75 and 95% of the bath, and finally withdrawing said assembly from said bath when the filler metal has established a joint between said members.

References Cited in the file of this patent

UNITED STATES PATENTS

| Number | Name | Date |
|---|---|---|
| 1,968,984 | Binder | Aug. 7, 1934 |
| 2,066,454 | Bonath et al. | Jan. 5, 1937 |
| 2,327,065 | Reimers | Aug. 17, 1943 |
| 2,439,159 | Dillinger et al. | Apr. 6, 1948 |
| 2,507,346 | Miller | May 9, 1950 |
| 2,569,097 | Grange et al. | Sept. 25, 1951 |
| 2,585,819 | Moore et al. | Feb. 12, 1952 |